US010419786B1

(12) United States Patent
Choi et al.

(10) Patent No.: US 10,419,786 B1
(45) Date of Patent: Sep. 17, 2019

(54) SYSTEMS AND METHODS FOR SECURELY GENERATING LIVE PREVIEWS

(71) Applicant: FuboTV Inc., New York, NY (US)

(72) Inventors: Sung Ho Choi, New York, NY (US); Thomas Symborski, New York, NY (US); Matthew Tretin, New York, NY (US)

(73) Assignee: FuboTV Inc., New York, NY (US)

( * ) Notice: Subject to any disclaimer, the term of this patent is extended or adjusted under 35 U.S.C. 154(b) by 0 days.

(21) Appl. No.: 16/040,900

(22) Filed: Jul. 20, 2018

(51) Int. Cl.
| | |
|---|---|
| *G06F 3/00* | (2006.01) |
| *G06F 13/00* | (2006.01) |
| *H04N 5/445* | (2011.01) |
| *H04N 21/2343* | (2011.01) |
| *H04N 21/2187* | (2011.01) |
| *H04N 21/81* | (2011.01) |
| *H04N 21/835* | (2011.01) |

(52) U.S. Cl.
CPC ..... *H04N 21/2343* (2013.01); *H04N 21/2187* (2013.01); *H04N 21/812* (2013.01); *H04N 21/835* (2013.01)

(58) Field of Classification Search
CPC .......... H04N 21/2343; H04N 21/2187; H04N 21/812; H04N 21/835
See application file for complete search history.

(56) References Cited

U.S. PATENT DOCUMENTS

| 5,594,794 | A | * | 1/1997 | Eyer | H04N 7/165 |
| | | | | | 380/231 |
| 9,355,426 | B2 | | 5/2016 | Flaharty et al. | |
| 9,843,656 | B2 | | 12/2017 | Eswaran et al. | |
| 2002/0170053 | A1 | * | 11/2002 | Peterka | H04N 7/165 |
| | | | | | 725/31 |
| 2003/0039271 | A1 | * | 2/2003 | Mizuno | H04N 7/163 |
| | | | | | 370/486 |
| 2009/0235308 | A1 | * | 9/2009 | Ehlers | H04H 20/106 |
| | | | | | 725/34 |
| 2015/0172748 | A1 | * | 6/2015 | Navarro | H04N 5/44543 |
| | | | | | 725/41 |
| 2015/0213316 | A1 | | 7/2015 | Vunic et al. | |
| 2015/0271541 | A1 | | 9/2015 | Gonder et al. | |
| 2017/0339114 | A1 | | 11/2017 | Watson et al. | |

* cited by examiner

*Primary Examiner* — Nasser M Goodarzi
*Assistant Examiner* — Patrick A Ryan
(74) *Attorney, Agent, or Firm* — Polsinelli PC

(57) ABSTRACT

The disclosed technology relates to securely generating live previews of a live video stream. A request for a first preview is received from a user device, the first preview request relating to a live video stream. The live video stream is clipped to generate a first live preview, the first live preview comprising a first start time and a first end time. A request for a second preview request is received from the user device, the second preview request relating to the live video stream. The live video stream is clipped to generate a second live preview, the second live preview has a second start time and a second end time. The second start time begins at a pre-configured duration after the first end time of the first live preview.

20 Claims, 6 Drawing Sheets

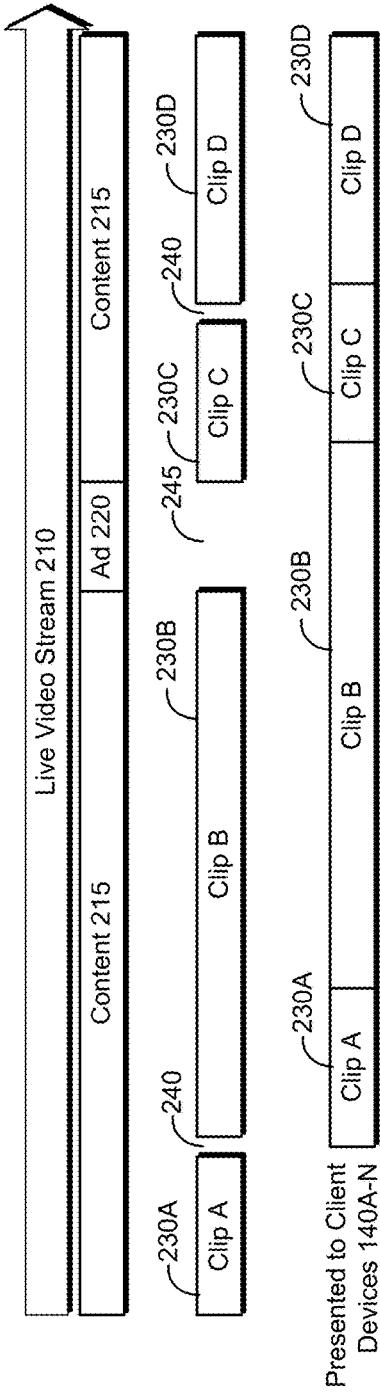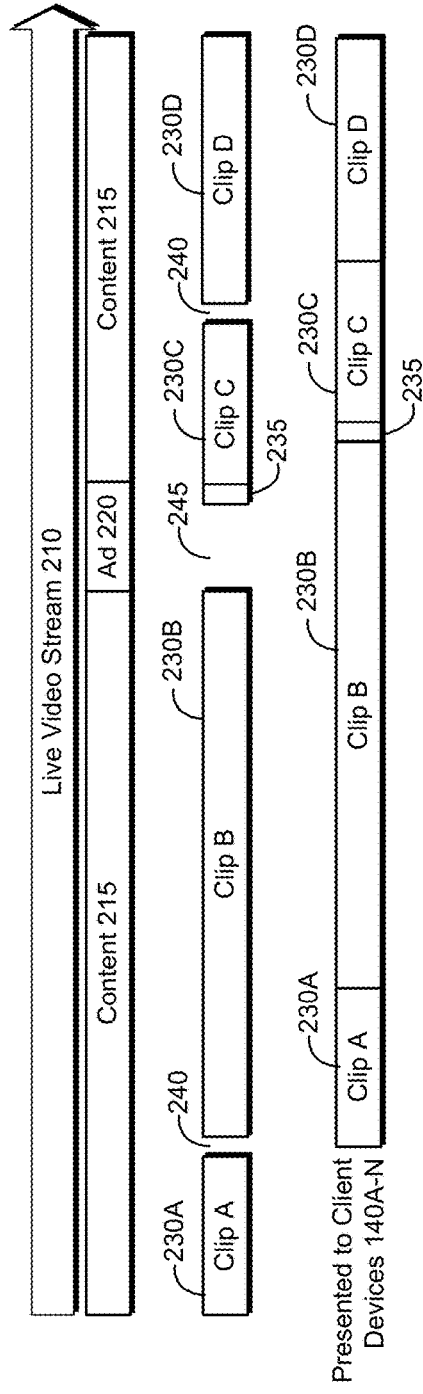

ical Field

This present disclosure relates generally to systems and methods for securely generating live previews of a live video stream, and more particularly to generating a time-limited segment of a live video stream that permits on-demand sampling, while also preventing complete reconstruction of the underlying video stream.

BACKGROUND

Conventional streaming services typically provide all-or-none access, i.e., they permit on-demand streaming for authenticated users by allowing the users to directly access a live video stream. Alternatively, access to live streams is blocked completely. While it would be desirable to provide on-demand segments of live video streams, such as sporting events, conventional streaming services do not provide any security mechanisms to prevent the requesting user from reconstructing a continuous feed of video using the requested segments, thereby circumventing the need to purchase the streaming content.

SUMMARY

One aspect of the present disclosure relates to a method for securely generating live previews of a live video stream. The method may include receiving a first preview request from a user device, the first preview request relating to a live video stream. The method also includes clipping the live video stream to generate a first live preview, the first live preview having a first start time and a first end time. The method includes transmitting the first live preview to the user device. The method further includes receiving a second preview request from the user device, the second preview request relating to the live video stream. The method includes clipping the live video stream to generate a second live preview, the second live preview having a second start time and a second end time. The second start time begins at a pre-configured duration after the first end time of the first live preview.

Another aspect of the present disclosure relates to a non-transient computer-readable storage medium having instructions embodied thereon, the instructions being executable by one or more processors to perform a method for securely generating live previews of a live video stream. The method may include receiving a first preview request from a user device, the first preview request relating to a live video stream. The method also includes clipping the live video stream to generate a first live preview, the first live preview having a first start time and a first end time. The method includes transmitting the first live preview to the user device. The method further includes receiving a second preview request from the user device, the second preview request relating to the live video stream. The method includes clipping the live video stream to generate a second live preview, the second live preview having a second start time and a second end time. The second start time begins at a pre-configured duration after the first end time of the first live preview Yet another aspect of the present disclosure relates to a system configured for securely generating live previews of a live video stream. The system may include one or more hardware processors configured by machine-readable instructions. The processor(s) may be configured to receive a first preview request from a user device, the first preview request relating to a live video stream; clip the live video stream to generate a first live preview, the first live preview having a first start time and a first end time; transmit the first live preview to the user device; and receive a second preview request from the user device, the second preview request relating to the live video stream. The processor(s) may be configured to clip the live video stream to generate a second live preview, the second live preview having a second start time and a second end time. The second start time begins at a pre-configured duration after the first end time of the first live preview.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 2A depicts a diagram illustrating a time sequence for clipping of a live video stream, in accordance with various aspects of the subject technology.

FIG. 2B depicts a diagram illustrating a time sequence for clipping of a live video stream, in accordance with various aspects of the subject technology.

DETAILED DESCRIPTION

Figure 1:
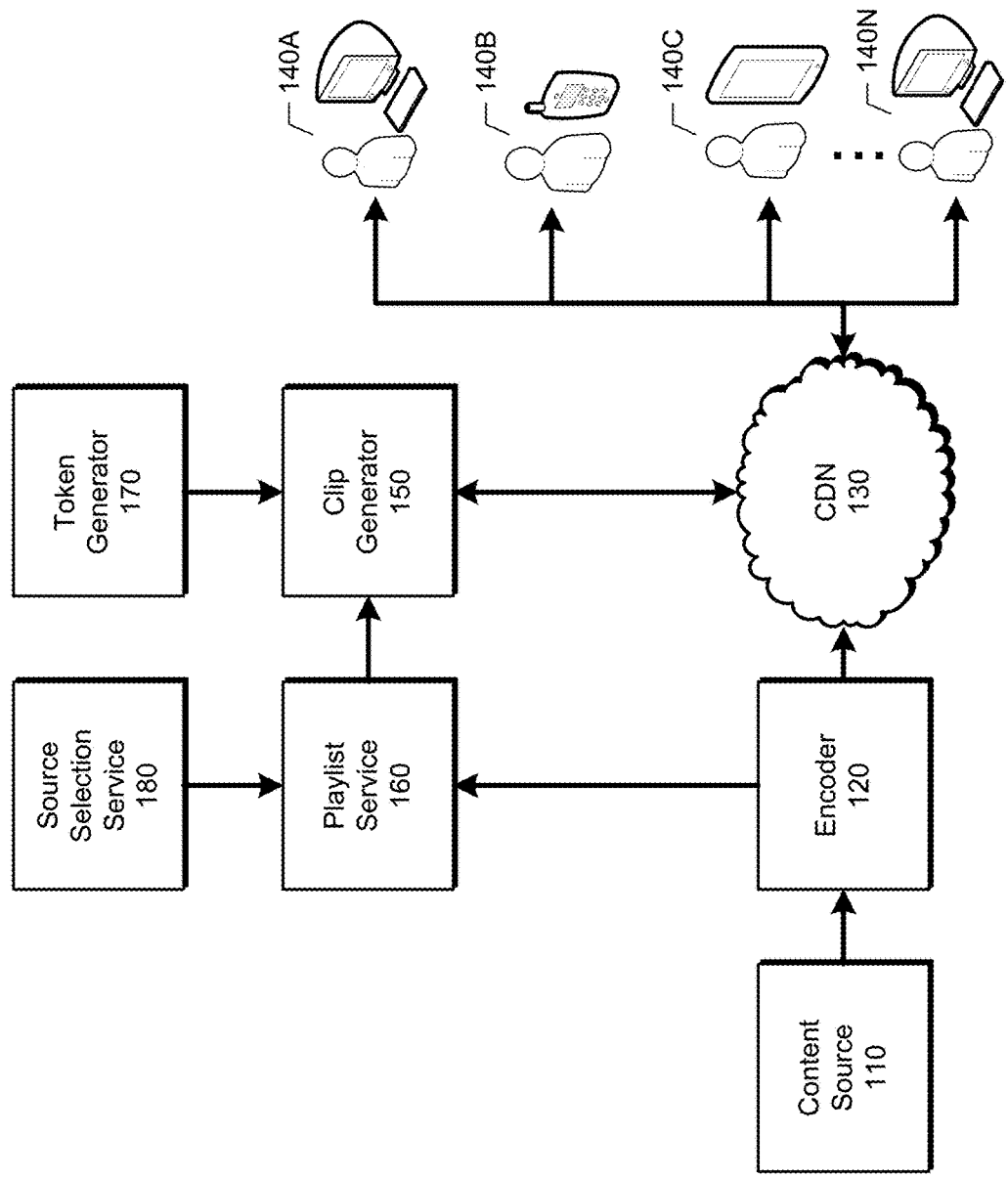
FIG. 1 is a conceptual block diagram illustrating an example system for generating live previews of a live video stream, in accordance with various aspects of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Video streaming services typically provide all-or-none access, i.e., they permit on-demand streaming for authenticated users by allowing the users to directly access a live video stream, alternatively, access to live streams is blocked completely. While it would be desirable to provide on-demand segments of live video streams to entice a user to join or subscribe for a streaming service, conventional streaming services are incapable of providing live previews of live video streams. In addition, because of the risk that a user may reconstruct a live video stream by reassembling the segments, any interest in providing live previews to the public of live video streams is outweighed by the risk that certain members of the public may circumvent the need to purchase the streaming content by reconstructing the video feed using the requested preview segments. Accordingly, there is a need for certain embodiments of a live video preview generator for securely generating live previews of a live video stream that permits on-demand sampling, while also preventing complete reconstruction of the underlying video stream.

The disclosed technology addresses the foregoing limitations of conventional streaming methods by providing time-limited on-demand segments of live video streams that are captured or clipped to prevent reconstruction of the entire underlying video stream.

In some implementations, the live video stream can be parsed such that certain segments or gaps in the stream are not served in response to any user request. As such, reconstruction of the complete underlying video stream is not possible, even across multiple requesting users/clients. Depending on implementation, the gap duration can be configured, and may differ depending on the origin of the request, type of content requested, and/or number of requests served.

FIG. 1 illustrates a conceptual block diagram illustrating an example system 100 for generating live previews of a live video stream, in accordance with various aspects of the subject technology. Various aspects are discussed with respect to a general wide area network for illustrative purposes, however, these aspects and others may be applied to other types of networks. For example, a network environment may be implemented by any type of network and may include, for example, any one or more of an enterprise private network (EPN), cellular network, a satellite network, a personal area network (PAN), a local area network (LAN), a broadband network (BBN), or a network of public and/or private networks, such as the Internet, or the like. The system 100 may be implemented using any number of communications links associated with one or more service providers, including one or more wired communication links, one or more wireless communication links, or any combination thereof. Additionally, the system 100 can be configured to support the transmission of data formatted using any number of protocols.

The system 100 includes a content source 110, an encoder 120, a content distribution network 130, one or more client devices 140A-N, a clip generator 150, a playlist service 160, a token generator 170 and a source selection service 180. In one aspect, the system 100 may include additional components, fewer components, or alternative components, such as additional encoders, different networks for different clients, and/or additional third-party servers. The system 100 may include additional components, such as routers or firewalls. The system 100 may be implemented as a single machine or distributed across a number of machines in a network, and may comprise one or more servers.

The system 100 includes one or more clients 140A-N. The clients 140A-N may include machines (e.g., servers, personal computers, laptops), virtual machines, containers, mobile devices (e.g., tablets or smart phones), or smart devices (e.g., set top boxes, smart appliances, smart televisions, internet-of-things devices). The clients 140A-N may utilize software applications, browsers, or computer programs that are running on a device such as a desktop computer, laptop computer, tablet computer, server computer, smartphone, or any other apparatus on which an application (e.g., client application) is running that at some point in time, involves a client requesting content and/or receiving streaming video provided by the system 100. In one aspect, the clients 140A-N may operate pursuant to the port control protocol (PCP) to control how data (e.g., packets) are handled to provide for the data flow of content and streaming video to the clients 140A-N. Other protocols for provisioning data flow to the clients 140A-N may also be used.

The devices (e.g., encoder 120, client devices 140A-N, clip generator 150, playlist service 160, token generator 170 and source selection service 180) may be connected over links through ports. Any number of ports and links may be used. The ports and links may use the same or different media for communications. Wireless, microwave, wired, Ethernet, digital subscriber lines (DSL), telephone lines, T1 lines, T3 lines, satellite, fiber optics, cable and/or other links may be used.

According to the subject technology disclosed herein, a remote content source 110 or provider and may provide a compressed video signal representing live video to one or more encoders 120. The content provided by the content source 110 may be transmitted or broadcasted by a data link, such as for example, a satellite, a terrestrial fiber cable, and/or an antenna. The compressed video signal received by the one or more encoders 120 may, for example, be compressed using a video encoder that may be a device or program that compresses data to enable faster transmission. The video encoder may compress the data into one or more video compression standards, such as H.265 and H.264 per one or more coding standards, such as MPEG-H, MPEG-4, and MPEG-2. The compressed video signal may contain video data representing programming and advertisements (e.g., content). The compressed video signal, may further include markers that delimit the advertisements to enable replacement or insertion of a particular advertisement within the programming (e.g., local advertisement insertion opportunity), scheduling information, and/or data representing one or more characteristics of the content associated with the programming. In one aspect, the markers, scheduling information, and/or content characteristics, may comply with certain standards, such as the SCTE-35 standard.

The compressed video signal may be processed to extract data, such as metadata representing the markers, scheduling, content characteristics, and/or the SCTE-35 information. In one aspect, the metadata extracted from the compressed video signal may be provided to the playlist service 160.

In some aspects, the encoder 120 may be configured to receive the compressed video signal and output encoded video data (e.g., video stream encoded in various resolutions and bitrates) to the content distribution network 130. The encoded video data output by the encoder 120 may comprise encoded segments of content associated with a video stream, provided in several versions—where each version provides the content at a different resolution and bitrate (e.g., profiles). In one aspect, the encoder 120 may be configured to decode, encode, and/or transcode the compressed video stream using one or more video compression standards, such as H.265 and H.264 per one or more coding standards, such as MPEG-H, MPEG-4, and MPEG-2.

For example, for a compressed video stream comprising a video stream of content provided at a video resolution of 1080p (1920×1080), a bitrate of about 50 Mbps, and compressed using the MPEG-2 standard, the encoder 120 may be configured to transcode or convert the compressed video stream into encoded video data (e.g., video stream encoded in various resolutions and bitrates). The encoded video data may comprise a plurality of profiles that include a first profile having a resolution of 1080p (1920×1080) and bitrate of about 2-6 Mbps, a second profile having a resolution of 720p (1280×720) and bitrate of about 0.9-3 Mbps, a third profile having a resolution of 5'76p (1024×576) and bitrate of about 0.6-2 Mbps, a fourth profile having a resolution of 480p (848×480) and bitrate of about 0.4-1.5 Mbps, a fifth profile having a resolution of 432p (768×432) and bitrate of about 0.3-1.3 Mbps, a sixth profile having a resolution of 360p (640×360) and bitrate of about 0.2-1 Mbps, and/or a seventh profile having a resolution of 240p (424×240) and bitrate of about 0.1-0.7 Mbps, using the H.264 standard.

The encoder 120 may also be configured to fragment, segment, or divide each respective profile into individual files (e.g., segments). Each segment may be configured to be individually decodable without requiring data from a previous or subsequent segment to start decoding a particular segment. For example, for encoded video data comprising an H.264 video stream generated by the encoder 120, the segments for each profile of the plurality of profiles (e.g., first, second, third, fourth, fifth, sixth, and seventh profiles) may comprise a few seconds of the content. In this example, such segments may each have a duration of about 2-30 seconds, and may typically have a duration of about 4-10 seconds. In other aspects, fragmentation, segmentation, and/or division of each respective profile into individual files (e.g., segments) may be performed by a packager that is configured to receive encoded video data from the encoder 120 and output the segments. In one aspect, the segments may be provided to the content distribution network ("CDN") 130 for storage, caching and/or serving to client devices 140A-N.

The encoder 120 may also be configured to generate a manifest that identifies the individual segments generated by the encoder 120, organized or listed in a particular order or sequence, to ensure proper playback or reading of the segmented and encoded video data by the client device 140A-N. The encoder 120 may further be configured to generate a high-level or master manifest that identifies the profiles and their characteristics (e.g., resolution, bitrate). The manifests may comprise text files that are provided to the playlist service 160, as discussed further below. In other aspects, generation of the manifest may be performed by the packager.

The CDN 130 may comprise a geographically distributed network of servers and/or data centers. The CDN distributes service spatially relative to the client devices 140A-N to provide high availability and high performance. The CDN 130 may store the video segments provided by the encoder 120 and serve the video segments to the client devices 140A-N. The CDN may include various physical network devices (e.g., servers, routers, or switches, etc.) or virtual network devices (e.g., that are instantiated as containers or virtual machines) for serving the video segments to the client devices 140A-N. The CDN 130 may be configured to receive requests for live previews from client devices 140A-N, serve video segments associated with the live previews when cached at the CDN 130, and validate tokens for video segments associated with the live previews generated by the clip generator 150.

The clip generator 150 may include electronic storage, one or more processors, and/or other components. The clip generator 150 may include communication lines, or ports to enable the exchange of information with a network and/or other computing platforms. Illustration of the clip generator 150 in FIG. 1 is not intended to be limiting. The clip generator 150 may include a plurality of hardware, software, and/or firmware components operating together to provide the functionality attributed herein to the clip generator 150. For example, clip generator 150 may be implemented by a cloud of computing platforms operating together as the clip generator 150. The clip generator 150 can include various physical network devices (e.g., servers, routers, or switches, etc.) or virtual network devices for securely generating a preview playlist for a time-limited segment, preview or clip of a live video stream.

In response to a request for a preview of a live video stream, the clip generator 150 may be configured to solicit a token from the token generator 170 for the requested preview of the live video stream. The token provided by the token generator 170 may be validated by the CDN 130 at time of playback, as discussed further below with reference to FIG. 3.

The clip generator 150 may also be configured to communicate with the playlist service 160 to receive metadata associated with the live video stream and/or a manifest of the live video stream. In the event there are blackout rules or geographical limitations associated with a client device 140A-N, the source selection service 180 informs the playlist service 160 of the blackout rules and/or geographical limitations. In response, the playlist service 160 may modify the manifest provided to the clip generator 150 to comply with the blackout rules and/or geographical limitations. The manifest may include a master manifest that identifies all the profiles and their characteristics (e.g., resolution, bitrate) available for a particular live video stream. The clip generator 150 may be configured to generate a preview playlist based on the metadata and/or manifest received from the playlist service 160. The preview playlist generated by the clip generator 150 is configured to reference video segments stored at the CDN 130, that when played or displayed according to the preview playlist, enables playback of the video segments served by the CDN 130 by a particular client device 140A-N at the appropriate resolution for a particular client device 140A-N, to thereby present a time-limited preview of a live video stream to the respective user of the client device 140A-N.

In some aspects, the preview playlist generated by the clip generator 150 facilitates playback of the same preview at different bitrates and/or resolutions, with each preview having a start time and an end time that is substantially the same as the other previews to ensure that any change in a bandwidth (e.g., upshift or downshift) associated with a client device 140A-N results in a smooth transition between previews of different resolutions.

The clip generator 150 is configured to generate a preview playlist that enables a time-limited preview of a live video stream to be presented or displayed to one or more users of one or more client devices 140A-N, regardless of whether the user or client device has an account, subscription or access rights to the live video stream. The time-limited preview may, for example, have a duration of about 10 seconds, 20 seconds, 30 seconds, 40 seconds, 50 seconds, 60 seconds, or may be shorter or longer than the aforementioned ranges so long as the duration for a preview is not equal to or greater than a duration for the content provided in the underlying live video stream. It is further understood that the clip generator 150 may generate a playlist for a preview of any duration, so long as the duration is not equal to or exceeds the duration of the content presented in the live video stream.

The clip generator 150 may also be configured to dynamically generate a preview playlist that omits advertisements that may be present in the underlying live video stream. For example, referring to FIG. 2A, a time sequence diagram 200 for clipping a live video stream is illustrated, in accordance with various aspects of the subject technology. A live video stream 210 includes content 215 and an advertisement break 220 that includes one or more advertisements. The clip generator 150 (as shown in FIG. 1) may be configured to process metadata associated with a content schedule, such as start time of content, duration of content, end time of content, channel, advertisement break start time, advertisement break end time, advertisement break duration, advertisement start time, advertisement end time, and/or advertisement insertion opportunities; to determine a duration of a preview (e.g., clip or segment), start time of a preview, and/or end time of a preview, and to ensure that the preview does not include an advertisement from the underlying live video stream 210. In this example, the clip generator 150 may determine that an advertisement break 220 having a particular duration is forthcoming. In response, the clip generator 150 may generate a preview playlist that provides for previews or clips with a duration equal to or greater than a duration of the advertisement break 220 to ensure that during the advertisement break 220, no advertisements presented during the advertisement break 220 are included in the preview.

The clip generator 150 may generate a first preview playlist that causes a first clip 230A to be created comprising a time limited preview of the content 215 presented in the live video stream 210. A client device 140A-N (as shown in FIG. 1) requesting a preview of the live video stream 210 at this time, will be presented with clip 230A. After the first preview playlist is generated, the clip generator 150 may allow one second, two seconds, three seconds, four seconds, five seconds, six seconds, seven seconds, eight seconds, nine seconds, ten seconds, twenty seconds, thirty seconds, or any amount of time sufficient to prevent reconstruction of the content 215 using the clips 230A-D, to pass and thereby create a gap 240 between adjacent clips 230A, B. It is understood that the duration of the gap 240 may be of any amount, as understood by a person of ordinary skill in the art. In some aspects, the duration of the clips 230A-D generated by the clip generator 150 and the duration of the gaps 240 in between adjacent clips 230A-D are each individually configurable.

In some aspects, by creating a gap between clips 230A, B, reconstruction of the content 215 provided in the underlying live video stream 210 is prevented and the risk of a user reconstructing the content 215 of the underlying live video stream 210 by using the clips 230A-D is minimized. Because the gaps 240 prevent a continuous video of the content 215 from being reconstructed using the clips 230A-D, the content 215 is secure and not compromised. As such, by inserting gaps 240 in between live previews 230A-D, the content 215 provided in the live video stream 210 cannot be compromised, regardless of whether a user has an authorized account or access to the content 215, and live previews may be provided to any user regardless of account status.

After the first gap 240, the clip generator 150 may generate a second preview playlist that causes a second clip 230B to be created that comprises a time limited preview of the content 215 presented in the live video stream 210. A client device 140A-N requesting a preview of the live video stream 210 at this time, will be presented with clip 230B. In generating the second preview playlist for the second clip 230B, the clip generator 150 may determine that a duration for the second clip 230B should be longer than a duration of the advertisement break 220. The second clip 230B may provide content before, during, and/or after the advertisement break 220, as shown in FIG. 2A.

After the advertisement break 220 is complete and the content 215 resumes in the underlying live video stream 210, the clip generator 150 may resume in generating preview playlists by generating a third preview playlist that causes a third clip 230C to be created comprising a time limited preview of the content 215 presented in the live video stream 210. A client device 140A-N requesting a preview of the live video stream 210 at this time, will be presented with clip 230C. As shown in FIG. 2A, during the advertisement break 220, the clip generator 150 does not generate a preview playlist that would include the advertisements presented during the advertisement break 220. As such, during the advertisement break 220, the clip generator 150 provides a gap 245 between the second clip 230B and the third clip 230C.

After the third preview playlist is generated for the third clip 230C, the clip generator 150 may provide a second gap 240 having a duration sufficient to prevent reconstruction of the content 215 using the clips 230A-D. After the second gap 240, the clip generator 150 may generate a fourth preview playlist that causes a fourth clip 230D to be created comprising a time limited preview of the content 215 presented in the live video stream 210. A client device 140A-N requesting a preview of the live video stream 210 at this time, will be presented with clip 230D.

Referring to FIG. 2B, an alternative time sequence diagram 200 for clipping a live video stream 210 is illustrated, in accordance with various aspects of the subject technology. FIG. 2B is similar to FIG. 2A except that the clip generator 150 (as shown in FIG. 1) is configured to generate a preview playlist having an overlap 235 with the advertisement break 220. In this example, the clip generator 150 may be configured to process metadata associated with the content schedule, such as start time of content, duration of content, end time of content, channel, advertisement break start time, advertisement break end time, advertisement break duration, advertisement start time, advertisement end time, and/or advertisement insertion opportunities; to determine a duration for an overlap 235 for a preview to allow an advertisement to be inserted within the preview. In one aspect, the overlap 235 may be disposed in the beginning, middle, or end of content provided in the preview. For example, referring to FIG. 2B, the overlap 235 is presented before the content 215 of clip 230C. The duration of the overlap 235 may be determined based on a duration of one or more available advertisements that may be identified for insertion into the overlap 235.

In another aspect, the clip generator 150 may be configured to generate a preview of content 215 based on data associated with a user of a client device 140A-N and metadata associated with the content 215. By way of nonlimiting example, the clip generator 150 may be configured to analyze data associated with a user, such as viewing preferences, recording preferences, recorded programming data, social media account activities relating to entertainment, client type, operating system, network connection, geographic location, available bandwidth, network protocol, screen size, device type, display capabilities, and/or codec capabilities; and metadata associated with one or more content characteristics, such as type of content (e.g., sporting event, awards show, sitcom, news show, documentary, pilot, animation, game show, legal drama, late night television, music television, cooking show, children's series daytime television, prime-time television, religious, science fiction, comedy, infomercial, variety show, or western), content rating, popularity, type of sporting event, content format (e.g., standard definition, high definition, 4K), and/or liveness (e.g., whether content is a "live" broadcast); to identify content 215 that may be most relevant to a particular user. For example, if a user is a soccer fan based on social media postings relating to a particular team or sport, the clip generator 150 may analyze one or more content characteristics to identify content 215 relating to soccer and generate a preview playlist of a live soccer game video stream 210 to present to the user via a client device 140A-N. In one aspect, the live preview generated by the clip generator 150 may be presented in a landing page of a website and/or a banner advertisement presented on a webpage (e.g., HTML 5 advertisement). In other aspects, because the clip generator 150 is configured to generate a preview 230A-D of content 215 presented in an underlying live video stream 210 based on a user's preferences or data, the clip generator 150 may provide unique clips or previews 230A-D to different users or client devices 140A-N, as desired, to present a dynamic experience for each unique user and/or client device 140A-N.

Referring back to FIG. 1, a client device 140A-N may request a live preview of an underlying live video stream from the CDN 130 using a preview playlist generated by the clip generator 150. In response to the request for a live preview, the CDN 130 may serve to the client device 140A-N video segments of the live preview identified in the preview playlist for viewing at the client device 140A-N. If the preview playlist for the live preview is not cached or stored at the CDN 130, the request for a live preview may be submitted to the clip generator 150 for generation of a preview playlist for a live preview, as discussed below with reference to FIG. 3.

Figure 3:
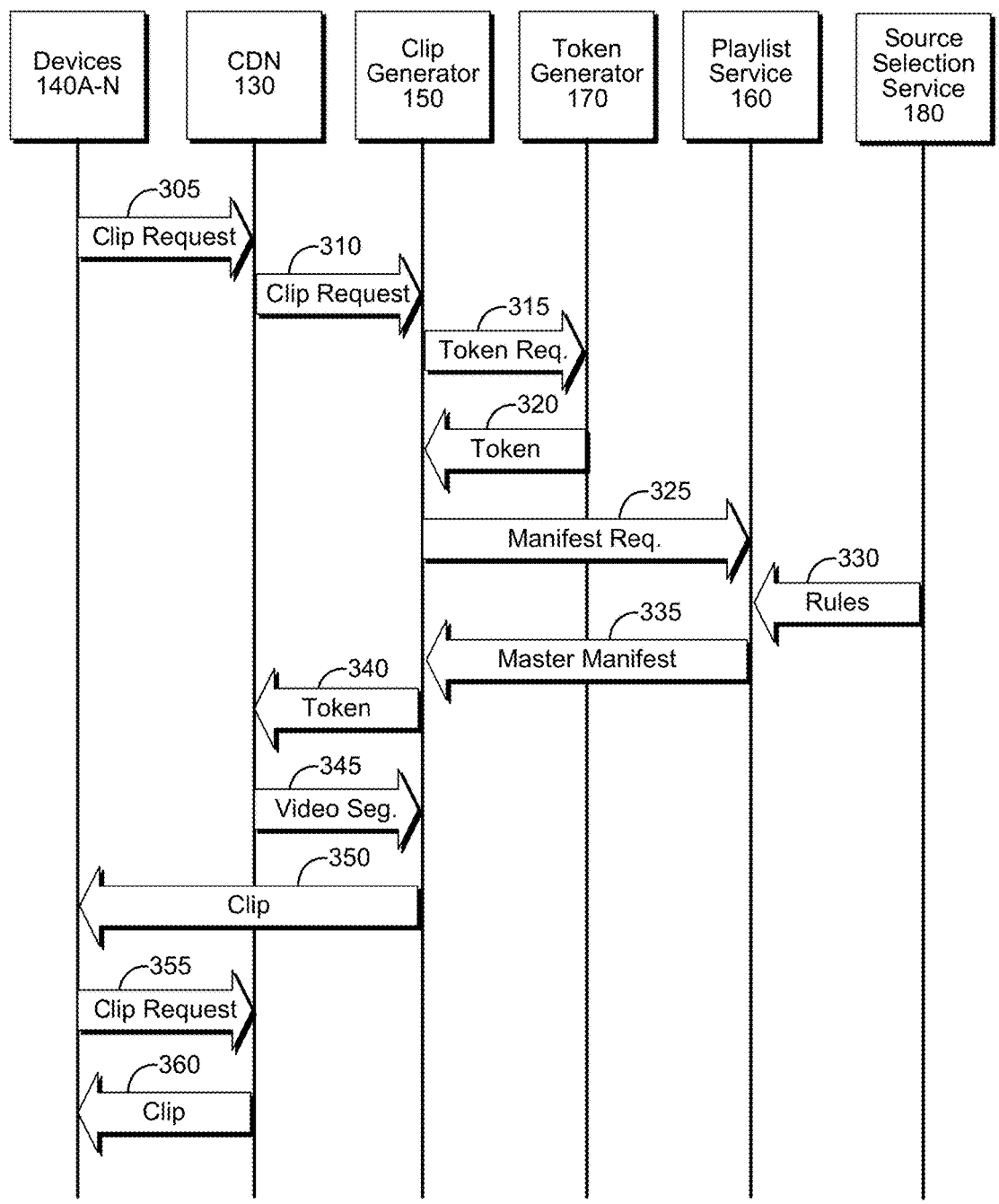
FIG. 3 depicts a sequence diagram showing the communications between client devices, content distribution network, clip generator, token generator, playlist service, and source selection service, in accordance with various aspects of the subject technology.

FIG. 3 depicts a sequence diagram 300 relating to generation of a secure live preview of a live video stream and shows communications between client devices 140A-N, content distribution network 130, clip generator 150, token generator 170, playlist service 160, and source selection service 180, in accordance with various aspects of the subject technology. Additional, different, or fewer acts may be provided. For example, acts for any one of the devices (e.g., content distribution network 130, client devices 140A-N, clip generator 150, playlist service 160, token generator 170, and source selection service 180) are performed with or without the other devices performing acts. In yet another example, processing, routing, or other networking acts are performed in addition to the acts shown in FIG. 3. The acts may be performed in the order shown. The order is listed in numerical sequence and/or from top to bottom in FIG. 3. In alternative aspects, the acts may be performed in other orders.

Referring to FIG. 3, a sequence diagram 300 is illustrated showing that the client devices 140A-N perform acts 305 and 355. The CDN 130 performs acts 310, 345 and 360. The clip generator 150 performs acts 315, 325, 340 and 350. The token generator 170 performs act 320. The playlist service performs act 335. The source selection service performs act 330. Other devices may perform any one or more of the acts, such as a different server or module. Any of the acts may involve operations by more than one component.

In act 305, a client device 140A-N requests a live preview or clip from a CDN 130. The request may include a request for a preview playlist or request for the preview itself. If the requested live preview or clip is not available at the CDN 130, then in act 310 the request is forwarded to a clip generator 150 for generation of a preview playlist that identifies video segments stored at the CDN 130 for playback, thereby generating a live preview segment of an underlying live video stream. In response to the request, in act 315 the clip generator 150 requests a token from a token generator 170. In act 320, in response to the request for a token from the clip generator 150, the token generator 170 generates and provides a token to the clip generator 150. A token or set of tokens is generated each time a request for a new preview playlist is made. The token allows access to the video segments associated with a particular preview playlist and may not be used to gain access for video segments identified or referenced in previously created or subsequently created preview playlists. In one aspect, the token or set of tokens may be configured to expire after a certain time has lapsed (e.g., 1 min. 5 min., 10 min., etc.). In other aspects, the token or set of tokens are not associated with a particular client device 140A-N or user, as the tokens allow access to the video segments identified in a particular playlist for any client device 140A-N or user, regardless of account status or whether the client device has a subscription or access to the underlying live video stream.

In act 325, the clip generator 150 requests a manifest and/or metadata relating to the underlying live video stream from a playlist service. In act 330, a source selection service 180 identifies any applicable blackout rules or geographical restrictions associated with the requesting client device 140A-N and provides the blackout rules or geographical restrictions to the playlist service 160 for remarking or modifying of the manifest. In act 335, the playlist service 160 provides the manifest and/or metadata to the clip generator 150 for use in generating a preview playlist.

The preview playlist generated by the clip generator 150 includes references to individual video segments stored at the CDN 130 that are organized or listed in a particular order or sequence, to ensure proper playback or reading of the video segments by the client device 140A-N to thereby present or display the live preview to the respective user. In one aspect, the preview playlist generated by the clip generator includes a high-level or master manifest that identifies all profiles and their characteristics (e.g., resolution, bitrate) associated with a particular live preview.

In act 340 the clip generator 150 requests the video segments identified in the preview playlist from the CDN 130 using the token provided by the token generator 170. In act 345, the CDN validates the token and if authorized, provides the requested video segments to the clip generator 150. Once validated, the CDN 130 may serve or route the video segments to the clip generator 150. In act 350, the clip generator 150 provides the requested clip or live preview to the requesting client device 140A-N. The CDN 130 may also be configured to store the clip or live preview and/or the preview playlist generated by the clip generator 150 for the corresponding clip or live preview, at the CDN 130 for future preview requests received from the client devices 140A-N.

The clip generator 150 may be configured to generate a live preview of an underlying live video stream based on user preferences, client device data, content schedule, and/or content characteristics, as described above. The live preview generated by the clip generator 150 may include an advertisement insertion opportunity, may exclude advertisements, and/or may be included in banner advertisements or landing pages to entice users of client devices 140A-N to subscribe or otherwise gain access to the entire underlying live video stream without interruptions or gaps. As the underlying live video stream is broadcast, the clip generator 150 may be configured to capture time-limited segments or clips of the content conveyed in the live video stream, and may be further configured to repeatedly generate additional time-limited segments or clips of the content as the live video continues to stream. The clip generator 150 is also configured to allow for gaps in between clip generation to prevent a user or client device from reconstructing the underlying video stream from previously-generated segments or clips, thereby eliminating the risk that the underlying live video stream and the content provided therein may be compromised.

In act 355, a new request for a live preview or clip is received from a client device 140A-N. The request for the live preview of clip is received at the CDN 130. In this example, the requested clip and/or preview playlist is stored at the CDN 130. In response, the CDN 130 provides to the client device 140A-N the preview playlist for the live preview. The client device 140A-N, in response to receiving and processing the preview playlist, identifies the appropriate profile for the client device 140A-N (e.g., resolution and bitrate), identifies the appropriate video segment, and requests the corresponding video segment from the CDN 130. In response to receiving the request for the video segment from the client device 140A-N, the CDN serves or otherwise provides the requested video segment to the client device 140A-N for playback to a user of the live preview.

In some aspects, by utilizing the video segments stored at the CDN 130 to generate the live previews, system resources are minimized as the video files or segments for the live preview or clip is not transmitted between the clip generator 150 and the client devices 140A-N. Rather, the video segments comprising the live preview or clip or stored at and served from the CDN 130, with the clip generator 150 merely transmitting a preview playlist, which may comprise a text file, that includes references or pointers to video segments stored at the CDN 130.

The various components of the system are configured by hardware and/or software to receive a request for a live preview of a live video stream, identify content to clip from a live video stream, insert gaps in between clip generation, identify a live video stream from which to generate live previews, generate a preview playlist that identifies video segments that when played by a client device result in a live preview being presented or displayed to a user, and/or combinations thereof. Logic is encoded in one or more non-transitory computer-readable media for operating the clients 140A-N, the components of the clip generator 150, CDN 130, playlist service 160, token generator 170, and source selection service 180. The logic includes code for execution by a processor or processors. When executed by a processor, the code is used to perform operations for receiving a request for a live preview of a live video stream, identifying content to clip from a live video stream, inserting gaps in between clip generation, identifying a live video stream from which to generate live previews, and generating a preview playlist that identifies video segments that when played by a client device result in a live preview being presented or displayed to a user.

Figure 4:
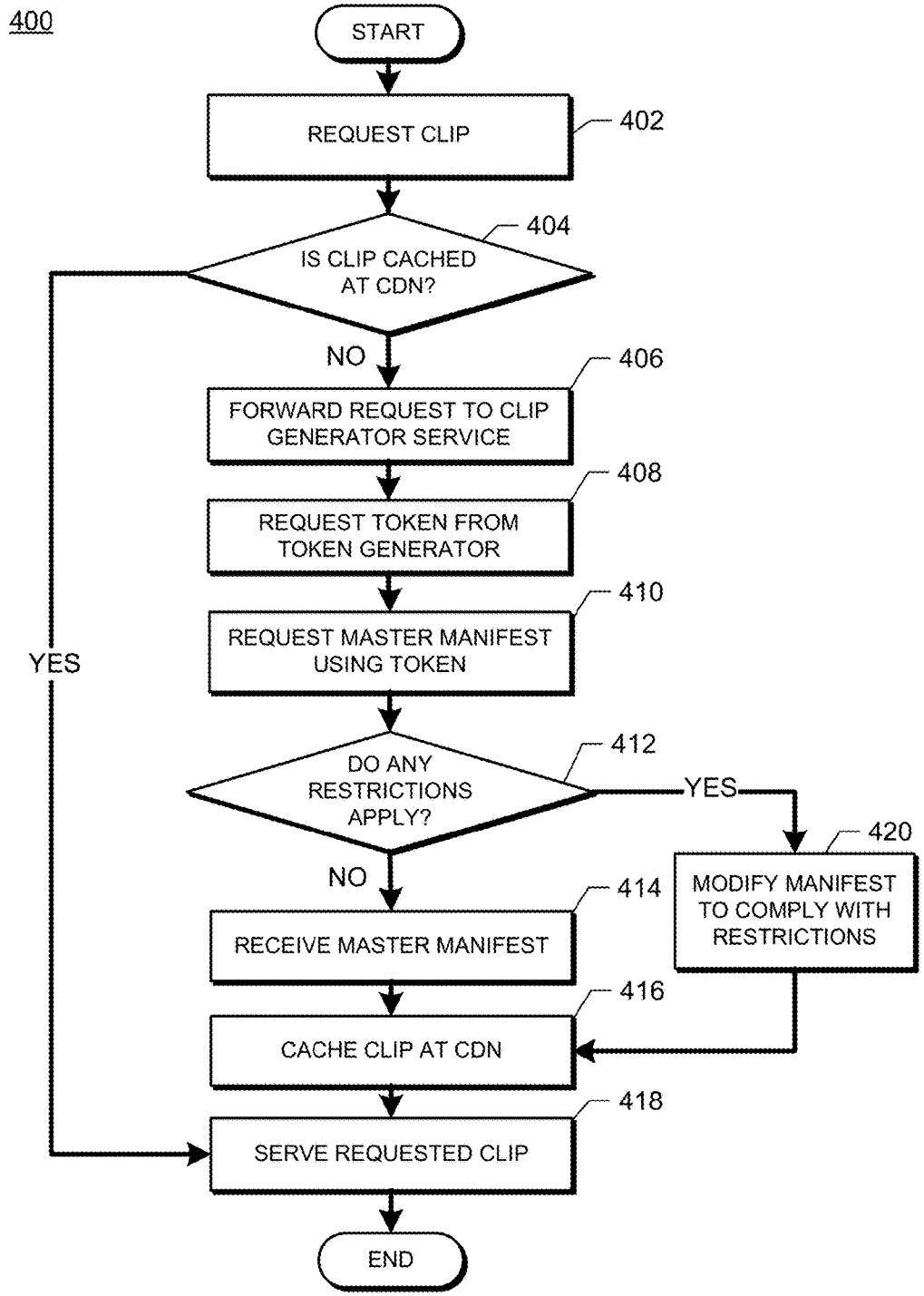
FIG. 4 depicts an example method for generating live previews of a live video stream, in accordance with various aspects of the subject technology.

FIG. 4 depicts an example method 400 for securely generating live previews of a live video stream, in accordance with various aspects of the subject technology. It should be understood that, for any process discussed herein, there can be additional, fewer, or alternative steps performed in similar or alternative orders, or in parallel, within the scope of the various aspects unless otherwise stated. The method 400 can be performed by a network, and particularly, a system for securely generating live previews (e.g., the system 100 of FIG. 1) or similar system.

At operation 402, a request for a clip for a preview of a live video stream is received from a client device (e.g., client devices 140A-N from FIG. 1). At operation 404, it is determined whether the requested clip or associated clip playlist is stored or cached at a CDN (e.g., CDN 130 from FIG. 1). If the requested clip or playlist is stored at the CDN, the requested clip and/or playlist is served or otherwise provided to the client device at operation 418 and the routine ends. If the requested clip is not available or otherwise stored at the CDN, then at operation 406 the request is forwarded to a clip generator service (e.g., clip generator 150 from FIG. 1). At operation 408, a token is requested from a token generator (e.g., token generator 170 from FIG. 1). The token may be time-limited and may be configured to only allow access to video segments associated with the requested clip or playlist.

At operation 410, a master manifest is requested from a playlist service (e.g., playlist service 160 from FIG. 1). The master manifest may identify or otherwise reference video segments associated with the live video stream. At operation 412, it is determined whether any restrictions, such as blackout rules or geographic limitations, are associated with the client device requesting the clip. If restrictions do apply, then at operation 420 the manifest is modified to account for the restrictions by the playlist service. If no restrictions apply, then at operation 414, the playlist service provides the master manifest to the clip generator for processing. As described above, the clip generator is configured to repeatedly generate clips of the live video stream, with intermittent gaps to prevent reconstruction of the underlying content of the live video stream using the clips. The clip generator may generate clips with or without advertisements, and may generate clips based on data associated with a client device or associated user. The clips generated by the clip generator are available to all client devices and associated users, regardless of account status, thereby allowing any member of the public to view the clip without requiring an account or subscription to the underlying live video stream.

At operation 416, the clip generated by the clip generator is stored or cached at the CDN for subsequent requests from client devices. At operation 418 the clip is served or otherwise provided to the requesting client device.

Figure 5:
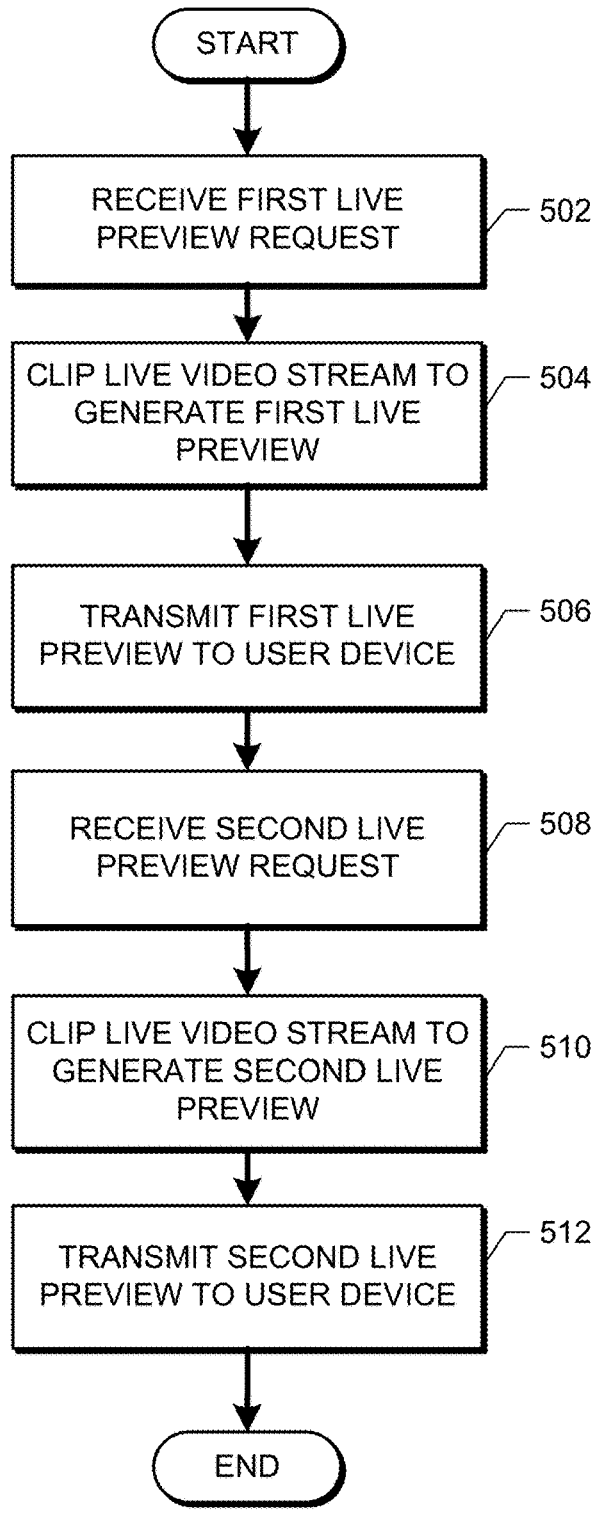
FIG. 5 depicts an example method for generating live previews of a live video stream, in accordance with various aspects of the subject technology.

FIG. 5 depicts an example method 500 for securely generating live previews of a live video stream, in accordance with various aspects of the subject technology. It should be understood that, for any process discussed herein, there can be additional, fewer, or alternative steps performed in similar or alternative orders, or in parallel, within the scope of the various aspects unless otherwise stated. The method 500 can be performed by a network, and particularly, a system for securely generating live previews (e.g., the system 100 of FIG. 1) or similar system.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

An operation 502 may include receiving a first preview request from a user device (e.g., client device 140A-N of FIG. 1), the first preview request relating to a live video stream. In one aspect, the live video stream may be selected based on data associated with a user of the user device. An operation 504 may include clipping the live video stream to generate a first live preview, the first live preview comprising a start time and an end time. In one aspect, the first live preview may comprise a first live preview playlist that comprises references to video segments that are listed in a sequence for playback by the user device. Operations 502 and 504 may be performed by one or more hardware processors configured by machine-readable instructions including a module that is the same as or similar as clip generator 150, in accordance with one or more implementations. An operation 506 may include transmitting the first live preview to the user device.

An operation 508 may include receiving a second preview request from the user device, the second preview request relating to the live video stream. An operation 510 may include clipping the live video stream to generate a second live preview, the second live preview comprising a start time and an end time. The start time for the second live preview may begin at a pre-configured duration after the end time of the first live preview. In some aspects, the second live preview may comprise a second live preview playlist that comprises references to video segments that are listed in a sequence for playback by the user device.

The method 500 may further include identifying an advertisement break included in the live video stream where the advertisement break has a start time and an end time. In one example, the start time for the second live preview may begin after the end time of the advertisement break. In another example, the start time of the second live preview may begin after the start time of the advertisement break and before the end time of the advertisement break. In yet another example, the end time of the second live preview may end after the start time of the advertisement break and before the end time of the advertisement break. Operations 508 and 510 may be performed by one or more hardware processors configured by machine-readable instructions including a module that is the same as or similar as clip generator 150, in accordance with one or more implementations.

An operation 512 may include transmitting the second live preview to the user device. The method 500 may also include requesting a first token for the first live preview, wherein the first token grants access to the first live preview and prevents access to the second live preview. The first token may be generated by a token generator (e.g., token generator 170 of FIG. 1). The method 500 may also include receiving a manifest associated with the live video stream. The manifest may be provided by a playlist service (e.g., playlist service 160 of FIG. 1). The method 500 may also include storing the first live preview and the second live preview at a content distribution network (e.g., CDN 130 of FIG. 1). The method 500 may also include displaying the first live preview and/or the second live preview in a webpage, such as in a landing page, advertisement, or banner advertisement.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 6:
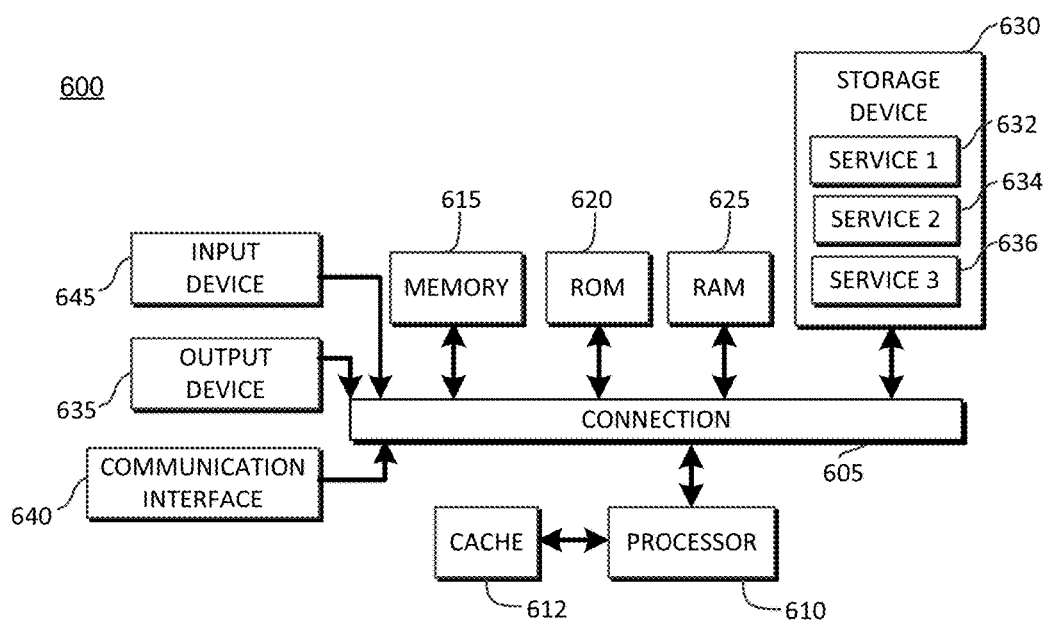
FIG. 6 illustrates an example of a system configured for providing adaptive video encoding, in accordance with some aspects.

FIG. 6 depicts an example of a computing system 600 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

System 600 includes at least one processing unit (CPU or processor) 610 and connection 605 that couples various system components including system memory 615, such as read only memory (ROM) 620 and random access memory (RAM) 625 to processor 610. Computing system 600 can include a cache 612 of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

It will be appreciated that computing system 600 can have more than one processor 610, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As used herein, the term "module" may refer to any component or set of components that perform the functionality attributed to the module. This may include one or more physical processors during execution of processor readable instructions, the processor readable instructions, circuitry, hardware, storage media, or any other components.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method, comprising:
   receiving a first preview request from a user device, the first preview request relating to a live video stream;
   clipping the live video stream to generate a first live preview, the first live preview comprising a first start time and a first end time;
   transmitting the first live preview to the user device;
   receiving a second preview request from the user device, the second preview request relating to the live video stream; and
   clipping the live video stream to generate a second live preview, the second live preview comprising a second start time and a second end time, wherein the second start time begins at a pre-configured duration after the first end time of the first live preview, and wherein the pre-configured duration is configured to prevent reconstruction of content presented in the live video stream.

2. The computer-implemented method of claim 1, further comprising requesting a first token for the first live preview, wherein the first token grants access to the first live preview and prevents access to the second live preview.

3. The computer-implemented method of claim 1, further comprising:
   receiving a manifest associated with the live video stream;
   identifying an advertisement break included in the live video stream, the advertisement break having a third start time and a third end time; and
   setting the second start time to begin after the third end time of the advertisement break.

4. The computer-implemented method of claim 1, further comprising:
   receiving a manifest associated with the live video stream;
   identifying an advertisement break included in the live video stream, the advertisement break having a third start time and a third end time; and
   setting the second start time to begin after the third start time of the advertisement break and before the third end time of the advertisement break.

5. The computer-implemented method of claim 1, further comprising:
   receiving a manifest associated with the live video stream;
   identifying an advertisement break included in the live video stream, the advertisement break having a third start time and a third end time; and setting the second end time to end after the third start time of the advertisement break and before the third end time of the advertisement break.

6. The computer-implemented method of claim 1, further comprising storing the first live preview and the second live preview at a content distribution network.

7. The computer-implemented method of claim 1, further comprising displaying the first live preview in a webpage.

8. The computer-implemented method of claim 1, wherein the first live preview comprises a first live preview playlist; and wherein the first live preview playlist comprises references to video segments that are listed in a sequence for playback.

9. The computer-implemented method of claim 1, wherein the second live preview comprises a second live preview playlist; and wherein the second live preview playlist comprises references to video segments that are listed in a sequence for playback.

10. The computer-implemented method of claim 1, wherein the live video stream is selected based on data associated with a user of the user device.

11. A non-transitory computer-readable medium comprising instructions, the instructions, when executed by a computing system, cause the computing system to:
receive a first preview request from a user device, the first preview request relating to a live video stream;
clip the live video stream to generate a first live preview, the first live preview comprising a first start time and a first end time;
transmit the first live preview to the user device;
receive a second preview request from the user device, the second preview request relating to the live video stream; and
clip the live video stream to generate a second live preview, the second live preview comprising a second start time and a second end time, wherein the second start time begins at a pre-configured duration after the first end time of the first live preview, and wherein the pre-configured duration is configured to prevent reconstruction of content presented in the live video stream.

12. The non-transitory computer-readable medium of claim 11, wherein the instructions further cause the computing system to request a first token for the first live preview, wherein the first token grants access to the first live preview and prevents access to the second live preview.

13. The non-transitory computer-readable medium of claim 11, wherein the instructions further cause the computing system to display the first live preview in a webpage.

14. The non-transitory computer-readable medium of claim 11, wherein the first live preview comprises a first live preview playlist; and wherein the first live preview playlist comprises references to video segments that are listed in a sequence for playback.

15. The non-transitory computer-readable medium of claim 11, wherein the second live preview comprises a second live preview playlist; and wherein the second live preview playlist comprises references to video segments that are listed in a sequence for playback.

16. The non-transitory computer-readable medium of claim 11, wherein the live video stream is selected based on data associated with a user of the user device.

17. A system comprising:
a processor; and
a non-transitory computer-readable medium storing instructions that, when executed by the system, cause the system to:
receive a first preview request from a user device, the first preview request relating to a live video stream;
clip the live video stream to generate a first live preview, the first live preview comprising a first start time and a first end time;
transmit the first live preview to the user device;
receive a second preview request from the user device, the second preview request relating to the live video stream; and
clip the live video stream to generate a second live preview, the second live preview comprising a second start time and a second end time, wherein the second start time begins at a pre-configured duration after the first end time of the first live preview, wherein the pre-configured duration is configured to prevent reconstruction of content presented in the live video stream.

18. The system of claim 17, wherein the instructions further cause the system to display the first live preview in a webpage.

19. The system of claim 17, wherein the first live preview comprises a first live preview playlist; and wherein the first live preview playlist comprises references to video segments that are listed in a sequence for playback.

20. The system of claim 17, wherein the live video stream is selected based on data associated with a user of the user device.

* * * * *